United States Patent
Cotton et al.

(10) Patent No.: US 9,429,670 B2
(45) Date of Patent: Aug. 30, 2016

(54) PLURAL-DEPTH BURIED SEISMIC SENSORS ACQUISITION SYSTEM AND METHOD

(71) Applicant: CGGVERITAS SERVICES SA, Massy (FR)

(72) Inventors: Julien Cotton, Paris (FR); Eric Forgues, Bures-sur-Yvette (FR)

(73) Assignee: CGG SERVICES SA, Massy (FR)

( * ) Notice: Subject to any disclaimer, the term of this patent is extended or adjusted under 35 U.S.C. 154(b) by 398 days.

(21) Appl. No.: 13/911,564

(22) Filed: Jun. 6, 2013

(65) Prior Publication Data

US 2014/0092708 A1 Apr. 3, 2014

Related U.S. Application Data

(60) Provisional application No. 61/707,278, filed on Sep. 28, 2012, provisional application No. 61/707,284, filed on Sep. 28, 2012.

(51) Int. Cl.
*G01V 1/36* (2006.01)
*G01V 1/20* (2006.01)

(52) U.S. Cl.
CPC ............... *G01V 1/364* (2013.01); *G01V 1/20* (2013.01); *G01V 2210/1429* (2013.01); *G01V 2210/16* (2013.01); *G01V 2210/56* (2013.01); *G01V 2210/612* (2013.01)

(58) Field of Classification Search
CPC .................................. G01V 1/20; G01V 1/364
USPC ............................................................ 367/57
See application file for complete search history.

(56) References Cited

U.S. PATENT DOCUMENTS

| | | | | |
|---|---|---|---|---|
| 2,154,548 A | * | 4/1939 | Weatherby | G01V 1/42 367/40 |
| 2,992,694 A | * | 7/1961 | Musgrave | G01V 1/20 181/107 |
| 3,195,676 A | * | 7/1965 | Eisler | G01V 1/28 346/33 C |
| 3,439,319 A | * | 4/1969 | Whitfill, Jr. | 367/19 |
| 3,531,760 A | * | 9/1970 | Whitfill, Jr. | 367/173 |
| 4,497,044 A | * | 1/1985 | Silverman | G01V 1/13 181/107 |
| 4,695,984 A | * | 9/1987 | Paal | G01V 1/362 367/36 |
| 5,128,904 A | * | 7/1992 | Chambers | 367/129 |
| 5,193,077 A | | 3/1993 | Weiglein et al. | |
| 5,253,217 A | * | 10/1993 | Justice, Jr. | G01V 1/366 367/46 |
| 5,363,094 A | * | 11/1994 | Staron et al. | 340/854.6 |
| 5,581,514 A | * | 12/1996 | Moldoveanu | G01V 1/3808 181/110 |
| 6,757,616 B1 | * | 6/2004 | Emmons | G01V 1/362 702/18 |

(Continued)

OTHER PUBLICATIONS

T. Bianchi et al., "Acquisitionand Processing Challenges in Continuous Active Reservoir Monitoring", SEG Int'l Exposition and 74th Annual Meeting, Denver, Colorado, Oct. 10-15, 2004, pp. 2263-2266.

(Continued)

*Primary Examiner* — Luke Ratcliffe
*Assistant Examiner* — Amienatta M Ndure Jobe
(74) *Attorney, Agent, or Firm* — Patent Portfolio Builders PLLC

(57) ABSTRACT

A system for collecting seismic data includes plural seismic sensors. The seismic sensors are buried underground. In one application, a first set of seismic sensors are buried at a first depth and a second set of seismic sensors are buried at a second depth. In another application, the sensors alternate along a line, one sensor from the first set and a next sensor from a second set. In still another application, the sensors are randomly distributed below the ground.

8 Claims, 20 Drawing Sheets

(56) References Cited

U.S. PATENT DOCUMENTS

| | | | |
|---|---|---|---|
| 6,894,949 B2* | 5/2005 | Aronstam | G01V 1/42 367/38 |
| 7,466,626 B2* | 12/2008 | Baaren | G01V 1/36 181/111 |
| 2004/0076077 A1 | 4/2004 | Robertsson et al. | |
| 2005/0259516 A1* | 11/2005 | Ray et al. | 367/178 |
| 2006/0262645 A1* | 11/2006 | Van Baaren | G01V 1/36 367/54 |
| 2007/0294036 A1* | 12/2007 | Strack et al. | 702/14 |
| 2009/0261968 A1* | 10/2009 | El-Hamamsy et al. | 340/539.1 |
| 2009/0265140 A1* | 10/2009 | Murias et al. | 702/188 |
| 2010/0315902 A1* | 12/2010 | Liang et al. | 367/40 |
| 2011/0203846 A1* | 8/2011 | Degrange et al. | 175/50 |
| 2012/0195164 A1 | 8/2012 | Meersman | |

OTHER PUBLICATIONS

E. Forgues et al., "Benefits of Hydrophones for Land Seismic Monitoring", 72nd EAGE Conference & Exhibition incorporating SPE EUROPEC 2010, Barcelona, Spain, Jun. 14-17, 2010, Extended Abstracts, B034.

E. Kragh et al., "Seismic Repeatability, Normalized RMS, and Predictability", The Leading Edge, Jul. 2002, pp. 640-647, 21.

W. Leaney et al., "Parametric Wavefield Decomposition and Applications", 60th Annual International Meeting, SEG, Expanded Abstracts, 1990, pp. 1097-1100.

J. Meunier et al., "Reservoir Monitoring Using Permanent Sources and Vertical Receiver Antennae: The Cere-la-Ronde case study", The Leading Edge, Jun. 2001, pp. 622-629, 20.

Extended European Search Report dated Mar. 4, 2014, in related European Application No. EP13186460.

E.Z. Ata et al., "Estimation of Near-Surface Elastic Parameters Using Multicomponent Seismic Data", Geophysics, Jul. 1993, pp. 1017-1029, vol. 58, No. 7.

A. Milton et al., "Reducing Acquisition Costs with Random Sampling and Multidimensional Interpolation", 2011 SEG Annual Meeting, San Antonio, Texas, Society of Exploration Geophysicists, Sep. 18, 2011, pp. 52-56, XP-002714019.

E. Schissele et al., "Seismic Repeatability—Is There a Limit?", Database Compendex [Online] Engineering Information, Inc & Society of Petroleum Engineers—71st European Association of Geoscientists and Engineers Conference and Exhibition—Society of Petroleum Engineers—71st European Association of Geoscientists and Engineers Conference and Exhibition, pp. 2737-2741, vol. 5, XP-002719598, 2010.

* cited by examiner

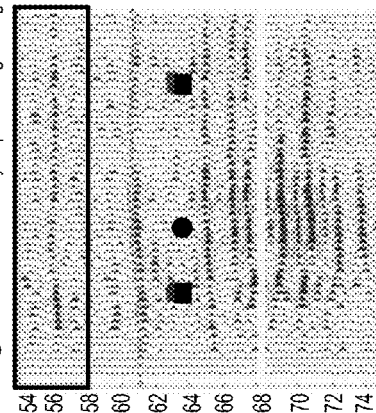
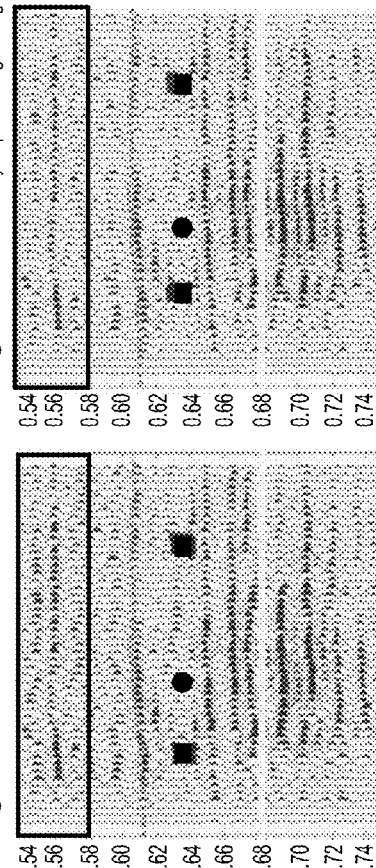
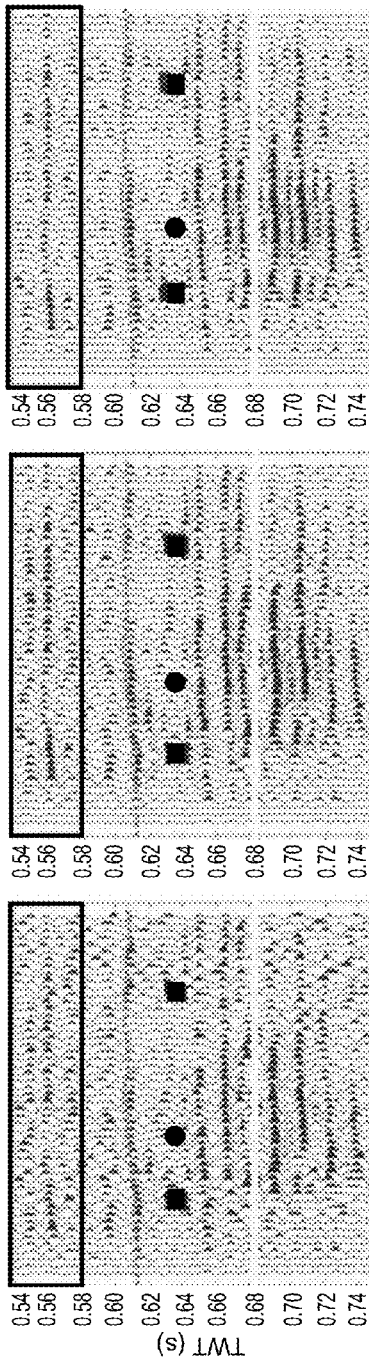
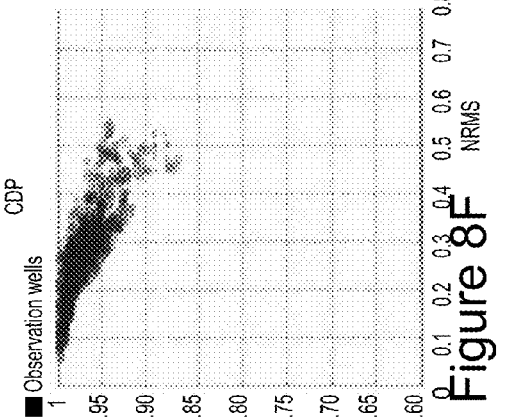
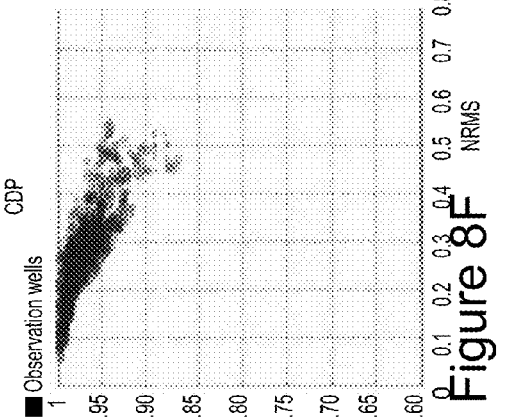
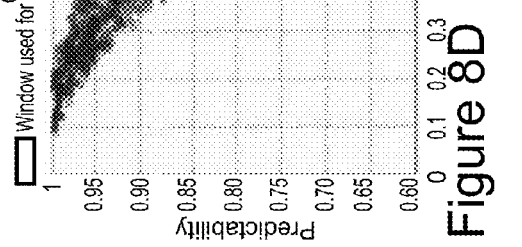

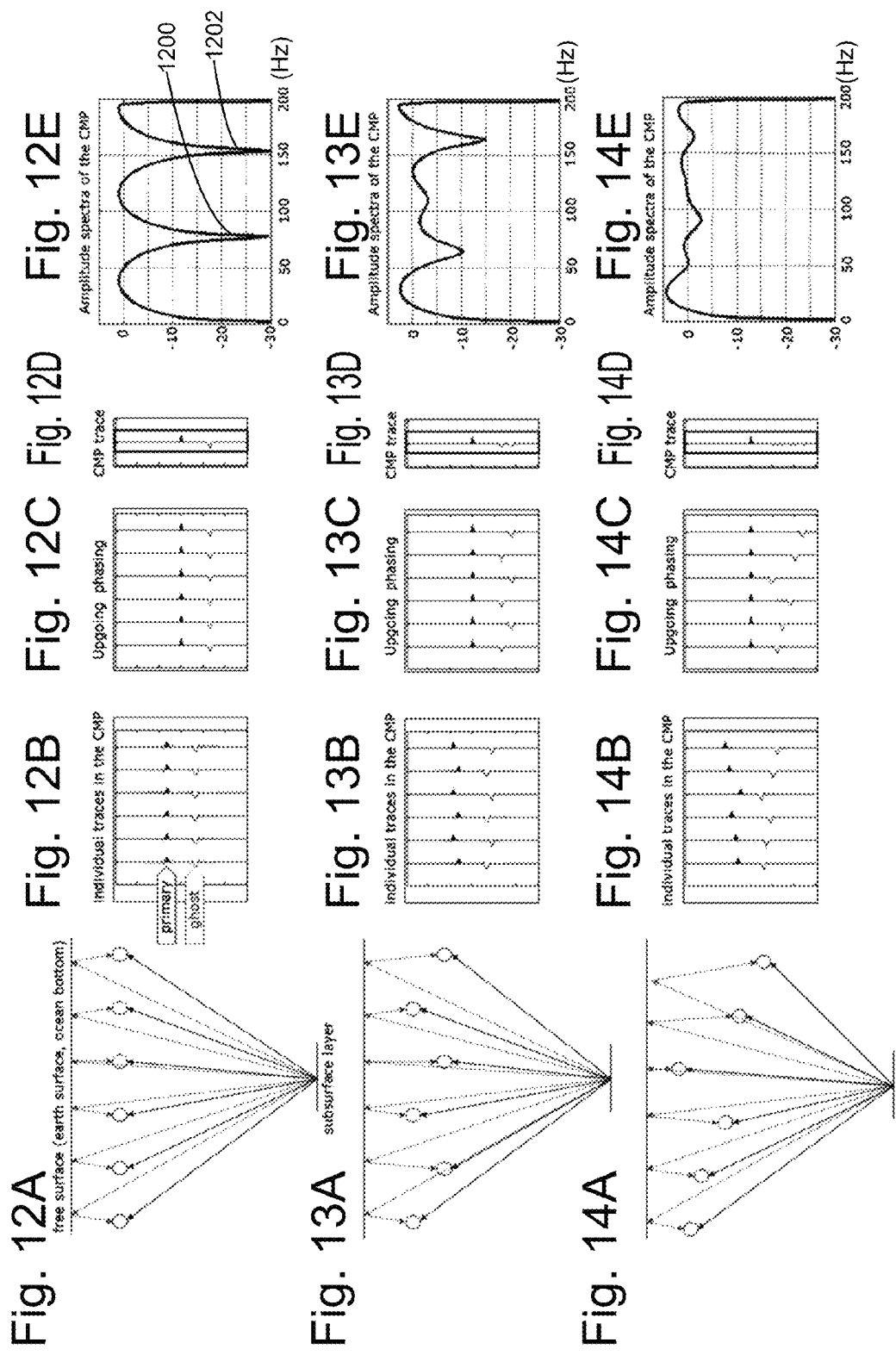

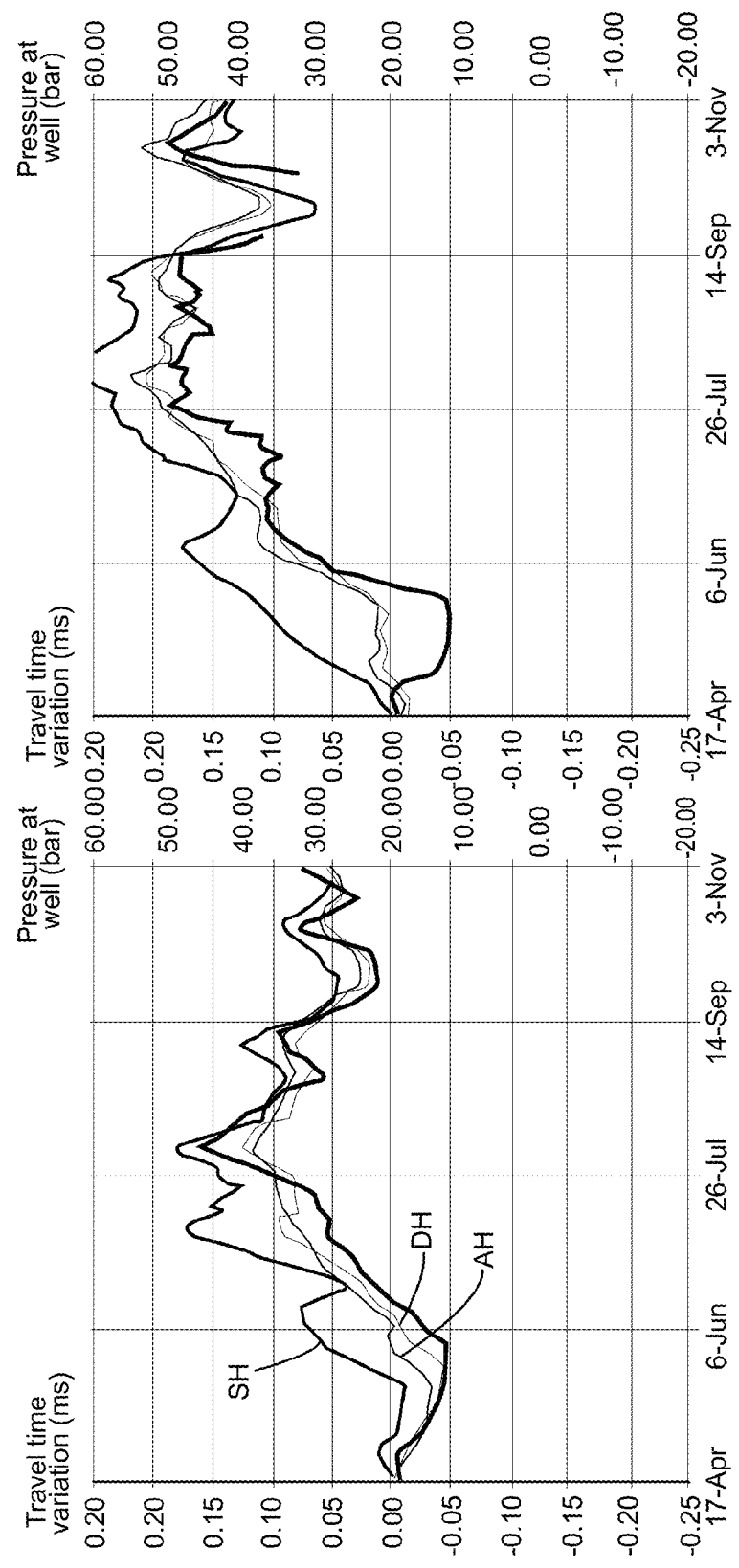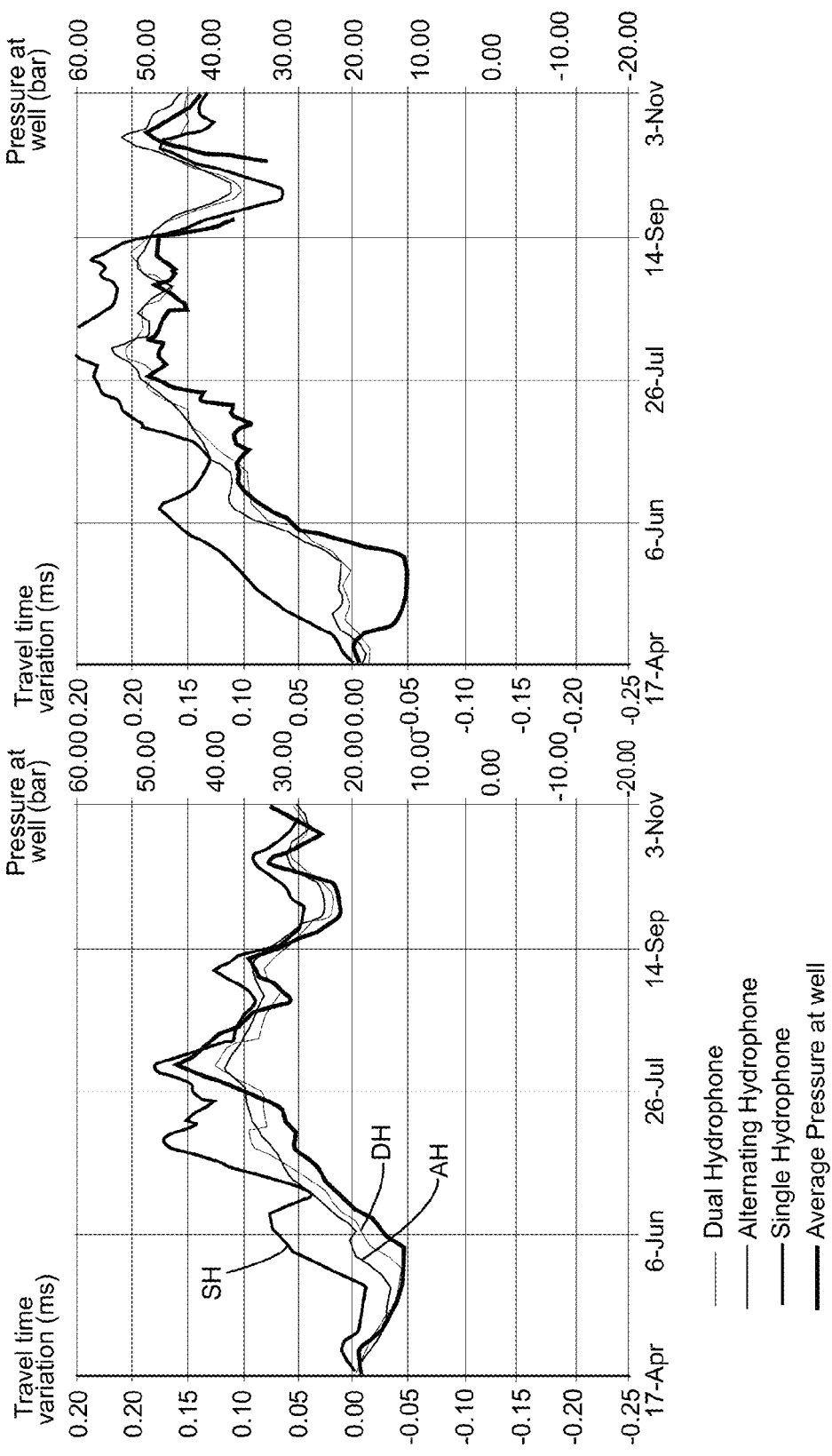
Figure 15
Figure 16

PLURAL-DEPTH BURIED SEISMIC SENSORS ACQUISITION SYSTEM AND METHOD

CROSS-REFERENCE TO RELATED APPLICATIONS

The present application is related to and claims the benefit of priority of U.S. Provisional Application Ser. No. 61/707,278, filed Sep. 28, 2012, and U.S. Provisional Application Ser. No. 61/707,284 having the title "Plural-Depth Buried Seismic Sensors Acquisition System and Method," and being authored by J. Cotton and E. Forgues, the entire contents of which are incorporated herein by reference.

BACKGROUND

1. Technical Field

Embodiments of the subject matter disclosed herein generally relate to systems and methods for using underground seismic sensors for collecting seismic data and, more particularly, to mechanisms and techniques for ghost reduction in seismic acquisition.

2. Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

Traditionally, a land seismic survey is performed in the following way. Seismic sensors (e.g., geophones, hydrophones, accelerometers, etc. or a combination of them) are electrically connected to each other and then deployed on the ground or below the ground. After all the seismic sensors have been deployed, one or more seismic sources are brought into the field and actuated to generate the seismic waves. The seismic waves propagate through the ground until they are reflected and/or refracted by various reflectors in the subsurface. The reflected and/or refracted waves propagate to the seismic sensors, where they are recorded. The recorded seismic waves may be used, among other things, for seismic monitoring of producing oil fields.

Time-lapse (or 4D) seismic monitoring of producing oil fields is an accepted method for optimization of field development and product recovery, providing significant improvements in recovery rates and savings in drilling costs. Time-lapse seismic reservoir monitoring is the comparison of 3D seismic surveys at two or more points in time. Time-lapse seismic reservoir monitoring also has potential for increasing the ability to image fluid movement between wells.

A traditional configuration for achieving a 4D seismic monitoring is illustrated in FIG. 1. FIG. 1 shows a system 10 for the acquisition of seismic data. The system 10 includes receivers 12 positioned over an area 12a of a subsurface to be explored and buried at the same depth below the surface 14 of the Earth. A number of vibroseismic sources 16 are also placed on the surface 14 in an area 16a, in a vicinity of the area 12a of the receivers 12. A recording device 18 is connected to the receivers 12 and placed, for example, in a station-truck 20. Each source 16 may be composed of a variable number of vibrators, typically between 1 and 5, and may include a local controller 22. Alternatively, the source may be a shallow buried explosive charge or other known devices for generating a seismic source, e.g., a metal plate placed on the ground and hammered with a hammer. A central controller 24 may be present to coordinate the shooting times of the sources 16. A GPS system 26 may be used to time-correlate the sources 16 and the receivers 12.

With this configuration, sources 16 are controlled to generate seismic waves, and the plurality of receivers 12 record waves reflected by the oil and/or gas reservoirs and other structures. The seismic survey may be repeated at various time intervals, e.g., months or years apart, to determine changes in the reservoirs. Although repeatability of source and receiver locations is generally easier to achieve onshore, the variations caused by changes in near-surface can be significantly larger than reservoir fluid displacement, making time-lapse 4D seismic acquisition and repeatability challenging. Thus, variations in seismic velocity in the near-surface are a factor that impacts repeatability of 4D surveys.

Several onshore time-lapse seismic case studies have shown the advantage of buried acquisition when looking at weak 4D signals (see Meunier et al, 2001, "Reservoir monitoring using permanent sources and vertical receiver antennae: The Céré-la-Ronde case study," The Leading Edge, 20, 622-629, or Forgues et al, 2010, "Benefits of hydrophones for land seismic monitoring," $72^{nd}$ Conference and Exhibition, EAGE, Extended Abstracts, B034, the content of both of which are incorporated herein by reference). Although the seismic repeatability is improved when sources and sensors are buried, a part of the wave field (the up-going part) is still transmitted through the weathering layer and reflected at the surface. These surface reflected waves, often called "ghosts," are affected by the near surface variations and can vary in time. In the case of daily seismic monitoring, small reservoir variations that are desired to be measured can be spoiled by the near surface waves that fluctuate in time due to temperature and moisture variation, because the waves coming from the reservoir interfere with the near-surface waves. In marine acquisition, several strategies have been developed for deghosting data using the streamer configuration.

However, the presence of the ghosts in the recorded seismic data remains a problem for the existing acquisition methods. Further, there is a need to improve the 4D seismic repeatability, increase the frequency content of the seismic data and reduce the number of sensors. Thus, there is a need for a system and method that address the above noted deficiencies of the current art.

SUMMARY OF THE INVENTION

According to an embodiment, there is a seismic data acquisition system for recording seismic waves related to a subsurface to be surveyed. The system includes plural seismic sensors located at corresponding depths underground, wherein the depths are randomly distributed between a minimum depth $d_{min}$ and a maximum depth $d_{max}$. The plural seismic sensors are buried underground beneath a weathering layer, and they are monitoring the subsurface for determining changes in the subsurface.

According to an embodiment, there is a method for recording seismic waves related to a subsurface to be surveyed. The method includes burying plural seismic sensors at corresponding depths underground, wherein the depths are randomly distributed between a minimum depth $d_{min}$ and a maximum depth $d_{max}$, wherein the plural seismic sensors are buried underground beneath a weathering layer;

recording with the plural seismic sensors seismic waves generated by seismic sources; and processing the recorded seismic waves to remove a ghost and to generate a final image of the subsurface.

According to another embodiment, there is a seismic data acquisition system for recording seismic waves related to a subsurface to be surveyed. The system includes first and second sets of seismic sensors distributed underground at first and second depths (d1, d2). Each sensor of the first set of seismic sensors is located at the first depth (d1), and each sensor of the second set of seismic sensors is located at the second depth (d2). The first and second sets of seismic sensors are buried underground beneath a weathering layer, and the first and second sets of seismic sensors are monitoring the subsurface for determining changes in the subsurface.

According to yet another embodiment, there is a method for recording seismic waves related to a subsurface to be surveyed. The method includes burying first and second sets of seismic sensors at first and second depths underground, wherein each sensor of the first set of seismic sensors is located at the first depth (d1), and each sensor of the second set of seismic sensors is located at the second depth (d2), recording with the first and second sets of seismic sensors seismic waves generated by seismic sources; and processing the recorded seismic waves to remove a ghost and to generate a final image of the subsurface.

BRIEF DESCRIPTION OF THE DRAWINGS

For a more complete understanding of the present invention, reference is now made to the following descriptions taken in conjunction with the accompanying drawings, in which:

FIGS. 8A-F illustrate SP converted wave attenuation and dual sensor deghosting according to an exemplary embodiment;

FIGS. 12A to 12E illustrate a traditional single depth sensor system and associated amplitude spectra;

FIGS. 13A to 13E illustrate an alternate dual-depth sensor system and associated amplitude spectra according to an exemplary embodiment;

FIGS. 14A to 14E illustrate a random depth sensor system and associated amplitude spectra according to an exemplary embodiment;

FIG. 15 illustrate travel time variations and pressure measured at a first location for various sensor systems according to exemplary embodiments;

FIG. 16 illustrate travel time variations and pressure measured at a second location for various sensor systems according to exemplary embodiments;

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system that includes hydrophones. However, the embodiments to be discussed next are not limited to hydrophones or to a land seismic system. The novel features of the embodiments may be applied to any seismic sensor, combination of seismic sensors and also in a marine context.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a system that includes plural seismic sensors. The sensors may include, among others, at least one of a geophone, a hydrophone, an accelerometer, etc. or a combination of them. The system may be deployed onshore or offshore. If deployed offshore, the seismic sensors may be buried under the sea floor. However, by placing the seismic sensors bellow a free surface, a ghost reflection is introduced by the free surface. The ghost reflection interferes with the primary waves and thus, the data quality and its repeatability is degraded, especially in the 4D context. Thus, instead of trying to place all the sensors at a same depth (flat mat of sensors) as traditionally performed, the novel system uses plural-depth sensors, alternating multi-depth sensors and/or random-depth sensors in order to facilitate the primary and ghost separation. By using these novel concepts, the 4D data repeatability is improved compared to the conventional buried flat spread. According to another exemplary embodiment, a dual-depth sensor acquisition system may be used. Still according to another exemplary embodiment, an alternating multiple-depth sensor acquisition system may be used. This last system generates the same results as the multiple-depth sensor system but uses half the number of receivers. These embodiments are now discussed in more detail.

Figure 1:
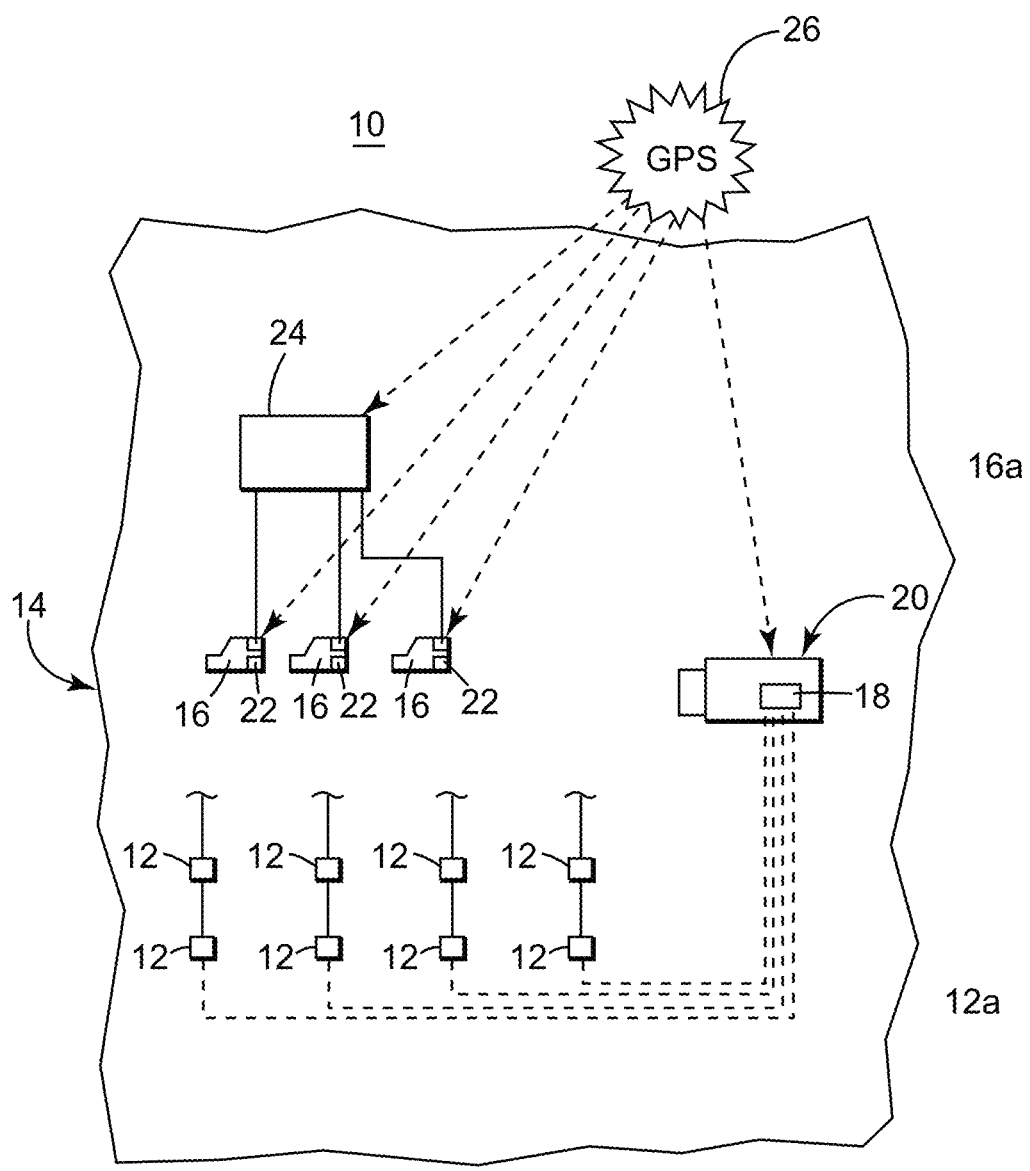
FIG. 1 is a schematic diagram of a conventional land seismic acquisition system.
Figure 2:
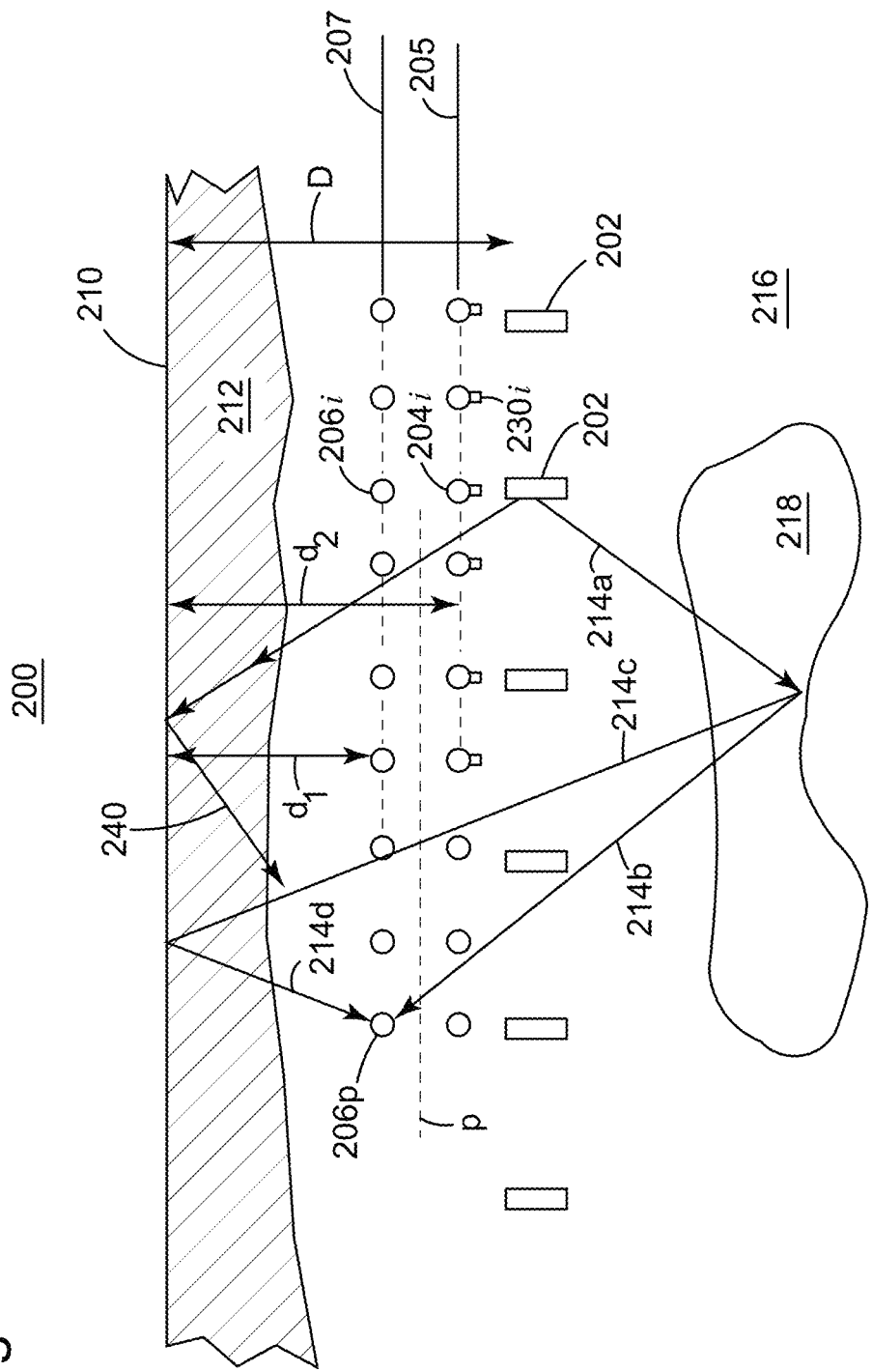
FIG. 2 is a schematic diagram of a dual-depth sensor system according to an exemplary embodiment.

According to an exemplary embodiment illustrated in FIG. 2, a plural-depth (dual-depth in this particular embodiment) sensor system 200 may include plural seismic sources 202 and sets of seismic sensors 204i and 206i distributed in two planes 205 and 207, respectively. In one application, the set of seismic sensors 204i are arranged to mirror the set of seismic sensors 206i relative to a plane P having a depth of (d1+d2)/2. In another application, the number of sensors 204i is different than the number of sensors 206i. Both the sources and the seismic sensors are buried below the Earth's surface 210.

In one application, the sources and the sensors are buried below the weathering layer 212 to preserve primary reflected waves 214b from being affected by climatic changes. FIG. 2 shows that a source 202 emits a seismic wave 214a, that gets reflected in the subsurface 216, that includes the reservoir 281. The reflected wave 214b is then recorded by a sensor 206p. At the same time, another reflected wave 214c arrives at the surface 210 and gets again reflected, forming the ghost wave 214d that is also recorded by the sensor 206p.

In one application, the first set of sensors 204i is located at a depth d1, which may be substantially 9 m, while the second set of sensors 206i is located at a depth d2, which may be substantially 6 m from the surface 210. Other values for the depths d1 and d2 may be used. The seismic sources 202 may be buried at a depth D substantially equal to 25 m, i.e., below the seismic sensors. The seismic source 202 may emit continuously during the monitoring period, e.g., more than a year. Geophones 230i have been buried next to the first set of seismic sensors (e.g., hydrophones) 204i for testing the P-Z summation. However, they are not necessary for the purpose of this invention.

Figures 3A, 3B:
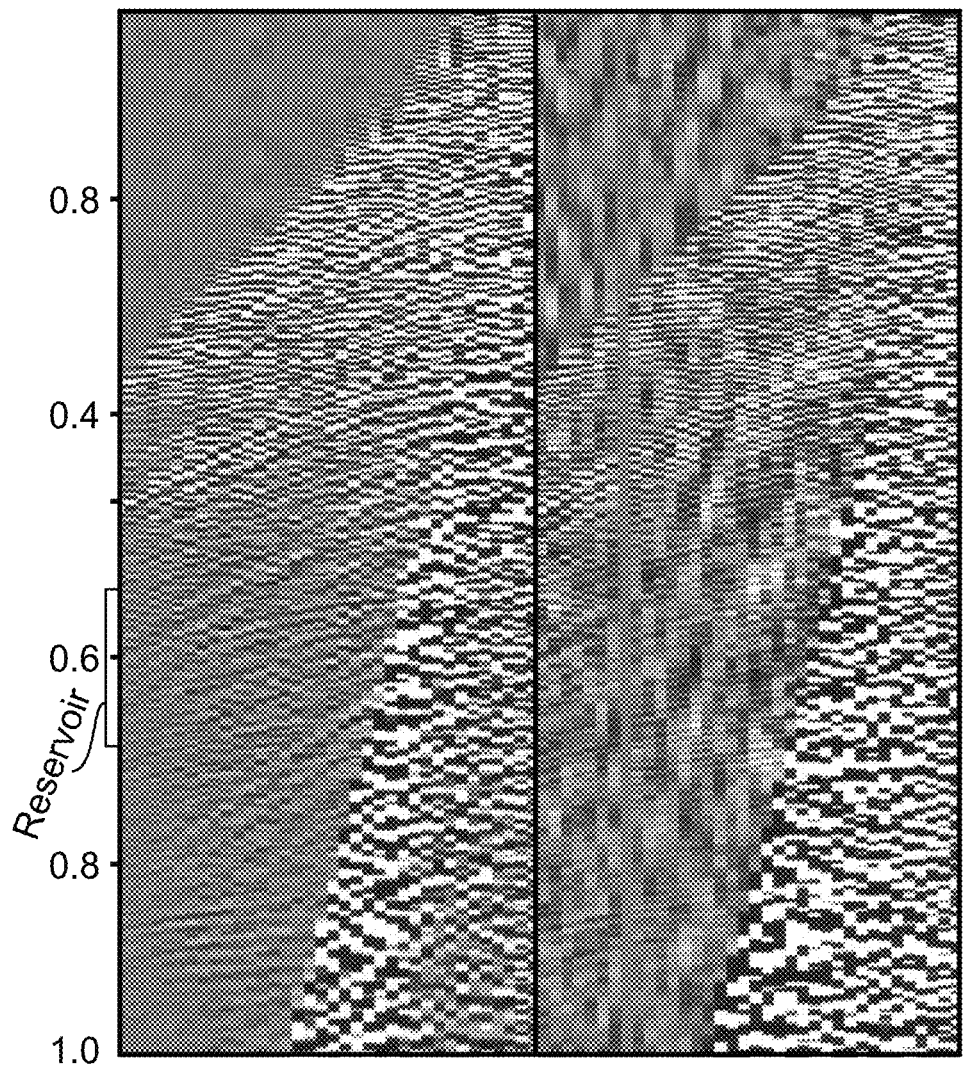
FIGS. 3A and 3B illustrate shot points recorded daily for the dual-depth sensor system.

The data recorded with the first set of seismic sensors (hydrophones) is show in FIG. 3A while the data recorded with the geophones, at the same depth of 9 m, is shown in FIG. 3B. It is noted that the geophones are about 15 dB noisier than the hydrophones.

At a depth of 9 m, where both hydrophones and geophones are located, the Vp/Vs ratio (i.e., the ratio of the speed of a P-wave and the speed of a S-wave) has been measured close to 7. This suggests that there will be a significantly higher ratio of shear to compressional waves on geophones compared to hydrophones. This theory is supported by the data observation where the quantity of S-wave and the noise level (mostly Rayleigh waves due to anthropic activities) is lower for hydrophones than for geophones.

On hydrophones, reflections at the reservoir (~600 ms) interfere with rather energetic and low apparent velocity waves interpreted as S-P waves 240 (see FIG. 2) converted at the near surface (see Hornman et al, 2012 "Continuous monitoring of thermal EOR at Schoonebeek for intelligent reservoir management," Proceedings of the International Intelligent Energy Conference, SPE, 150215, the entire content of which is incorporated herein by reference). The strong S-wave content generated by the buried source travels up to the surface and is converted into P-waves when it reaches near-surface heterogeneities. These waves 240 are then back-scattered or refracted to the sensors with an almost horizontal incidence which is not recorded by the geophones but only by the hydrophones.

Figure 4:
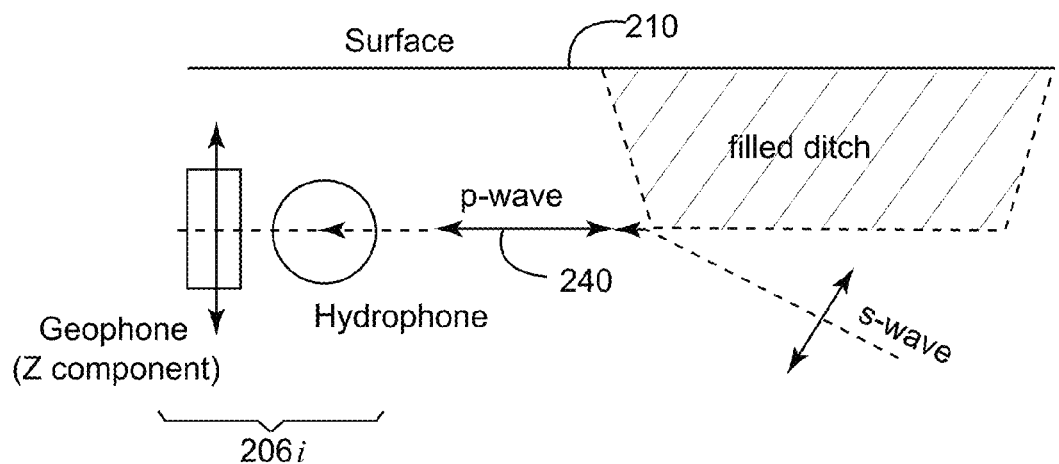
FIG. 4 is a schematic diagram of a near-surface S-P converted wave.

A more precise study has shown that the main part of these converted waves came from an unconsolidated filled ditch as illustrated in FIG. 4. Like the surface ghost, these near-surface converted waves fluctuate with respect to seasonal changes (soil moisture, frost and ground temperature) and can be considered as 4D noise for reservoir monitoring.

Figure 5:
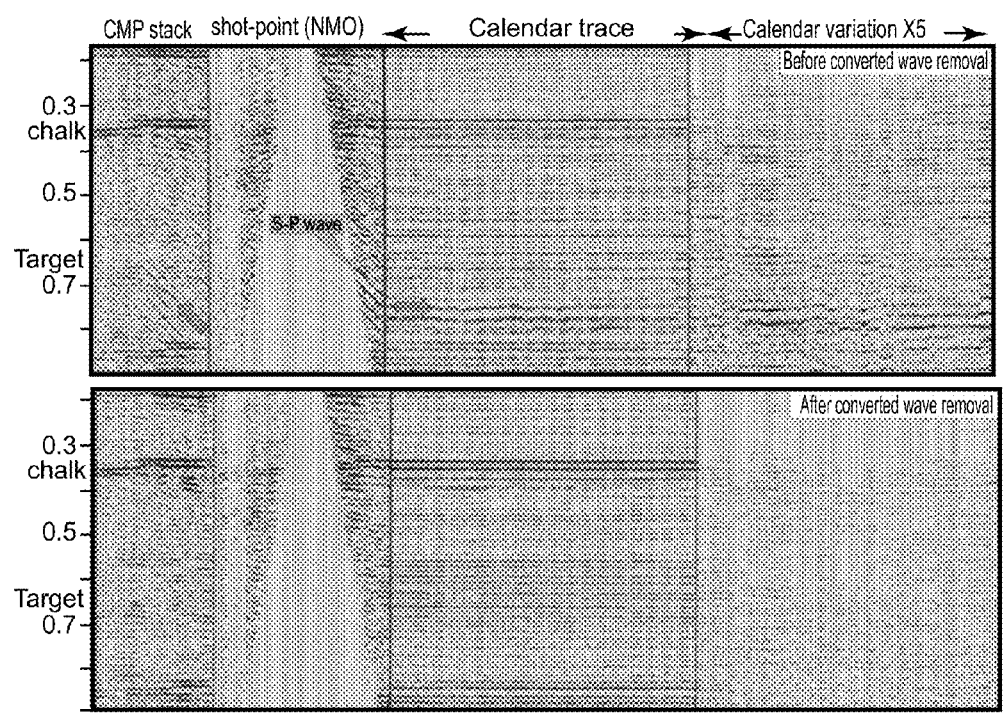
FIG. 5 illustrate SP-waves attenuation using a radon transform according to an exemplary embodiment.

In this regard, it has been observed that variations of the SP-waves are finely correlated with the surface temperature with values of 0.2 ms/° C. and 1.7%/° C. for time shift and amplitude respectively. In order to reduce their impact, it is possible to use the processing concept of wave attenuation in the time-lapse domain in a similar manner to the one used by Bianchi et al., 2004, "Acquisition and processing challenges in continuous active reservoir monitoring," $74^{th}$ Annual International Meeting, SEG, Expanded Abstracts, 2263-2266, the entire content of which is incorporated herein by reference. Then, the residual waves are reduced using a high resolution radon transform in the Tau-P domain as illustrated in FIG. 5.

Figure 6:
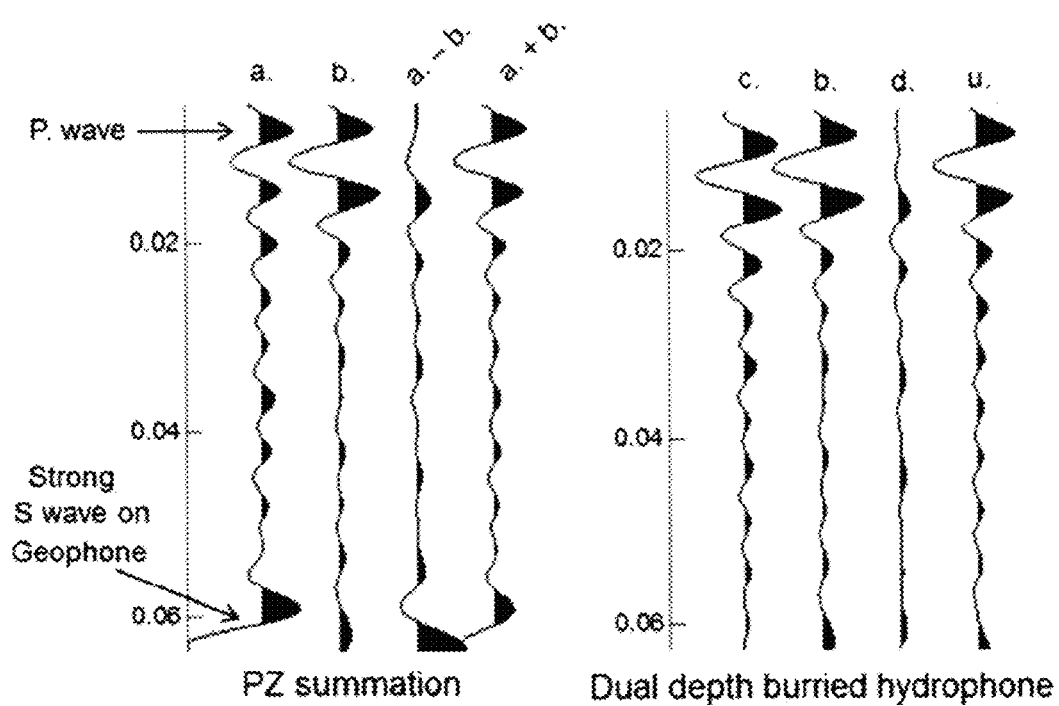
FIG. 6 illustrate deghosting results with PZ summation and dual-depth sensor system according to an exemplary embodiment.

Several ways to reduce the ghost effect can be envisaged in permanent buried acquisition. Firstly, it is possible to use the natural wave attenuation of the unconsolidated near surface and increase the source and receiver depths. Secondly, it is possible to use dual sensors at the same location (geophone and hydrophone) and sum them after data unit conversion (i.e., the P-Z summation). Finally, the use of dual-depth hydrophones becomes significantly more attractive. For this last approach, it is possible to use the parametric wave-field decomposition proposed by Leaney (1990, "Parametric wavefield decomposition and applications," $60^{th}$ Annual International Meeting, SEG, Expanded Abstracts, 1097-1100, the entire content of which is incorporated herein by reference) to separate the up-going and down-going waves from hydrophones at 6 m and 9 m with a minimization of the calendar variation as a criterion as illustrated in FIG. 6. FIG. 6 shows deghosting results obtained with a PZ summation (i.e., using both hydrophone and geophone data) and with the dual-depth sensor system of FIG. 2.

Figure 7:
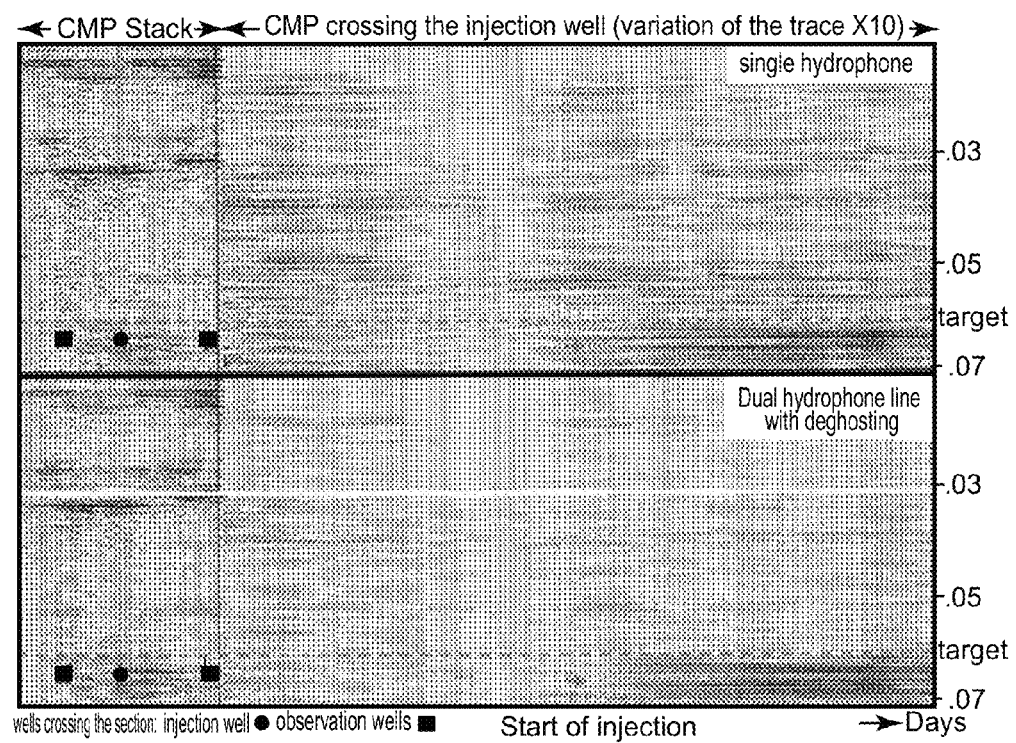
FIG. 7 illustrate SP-waves attenuation using a single hydrophone line and a dual-depth hydrophone system according to an exemplary embodiment.

As most of the converted waves have been removed, it is possible to consider that the remaining 4D noise is mainly due to the receiver ghost variations. It may be assumed that the propagation is vertical and that the two hydrophones have an identical response. Thus, the 4D noise above the reservoir is reduced, and the 4D signal at the reservoir is visible when the injection starts as illustrated in FIG. 7. To evaluate the improvement provided by the different processing steps, the repeatability is analyzed in a 40 ms time window just above the reservoir. Predictability is sensitive to the length of the correlation window and to the number of lags in the correlations, so absolute numbers are not meaningful (see Kragh and Christie, 2002, "Seismic repeatability, normalized rms, and predictability," The Leading Edge, 21, 640-647). Nevertheless, predictability gives a relative idea of the seismic repeatability improvement with the different processing steps.

It can be seen in FIGS. 8A-F that the S-P converted wave attenuation and the dual sensor deghosting lead to a significant enhancement in the seismic repeatability as both NRMS and predictability are improved.

Figure 9:
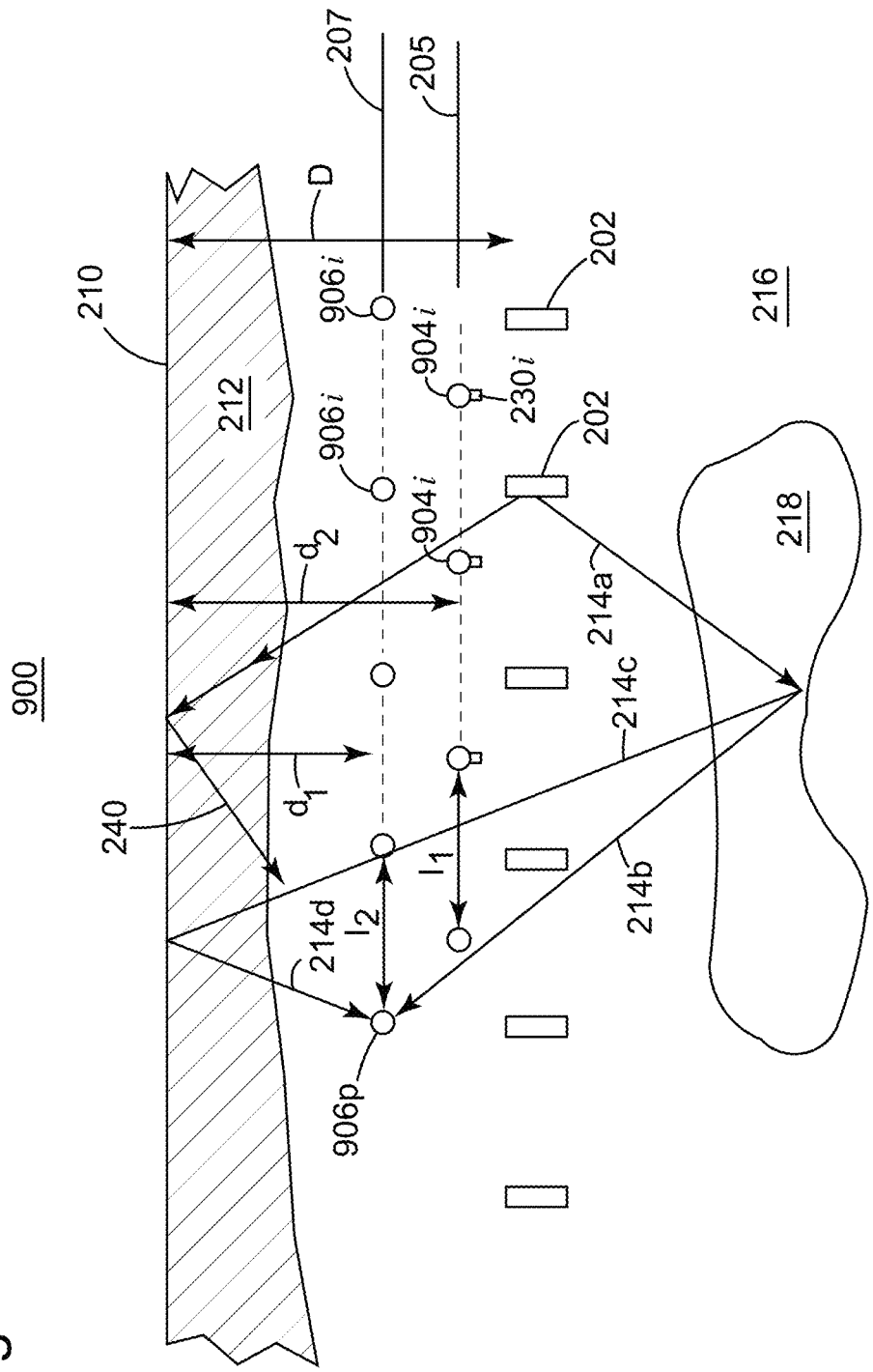
FIG. 9 is a side view of an alternating dual-depth sensor system according to an exemplary embodiment.

According to another exemplary embodiment illustrated in FIG. 9, instead of placing the first and second sets of seismic sensors in pairs at the different depths d1 and d2, they may distributed in an alternating dual-depth arrangement as shown in FIG. 9. In other words, a sensor 904i from the first set of sensors is not placed on a same vertical line as a sensor 906i from the second set of sensors. In one application, a distance I1 between two adjacent sensors 904i and 904j has a fixed value and a distance I2 between two adjacent sensors 906i and 906j has another fixed value. In one application, I1=I2. In another application, each of the distances I1 and I2 may vary along the line of sensors.

Figure 10:
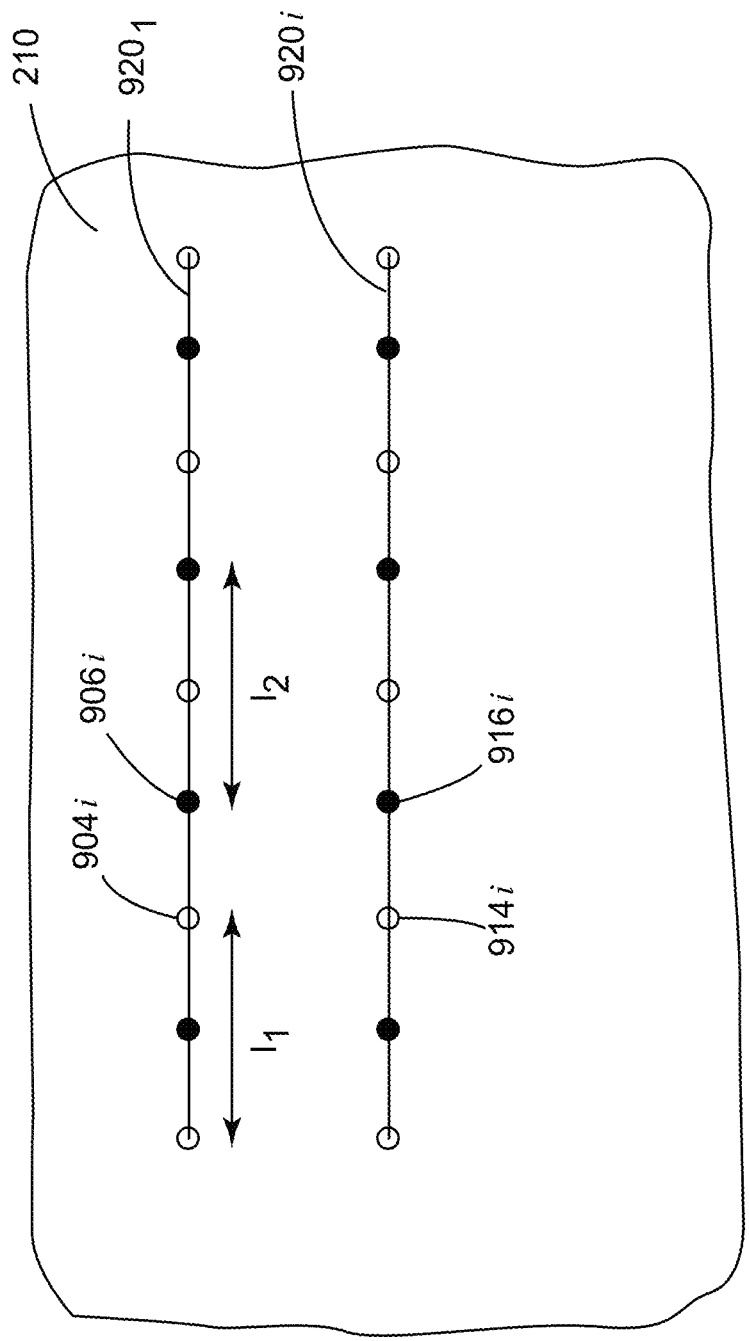
FIG. 10 is an aerial view of an alternating dual-depth sensor system according to an exemplary embodiment.

It is noted that an aerial representation of the system 900 is shown in FIG. 10 and indicates that the first set of sensors $904_i$ and the second set of sensors $906_i$ may be buried together with other sets of sensors $914_i$ and $916_i$ that may have similar configurations with the set of sensors $904_i$ and $906_i$. In other words, the sensors that are buried below the surface 210 may form plural lines $920_i$. A line may include a first set of seismic sensors $904_i$ and a second set of seismic sensors $906_i$, and the seismic sensors from the two sets alternate along the line.

It is further noted that although the above embodiments have been discussed with reference to a land seismic acquisition system, the same is true for a marine seismic acquisition system with the difference that the land surface 201 becomes the sea bed and the sensors are buried in the seabed. Also, the embodiments discussed herein are applicable not only when a source 202 generates seismic waves but also when the earth itself generates the seismic surfaces, e.g., a fracture in the reservoir 218 may be the seismic source. Other events that may constitute a seismic source are changes in the reservoir produced by steam injection, pressure injection, etc.

Figure 11:
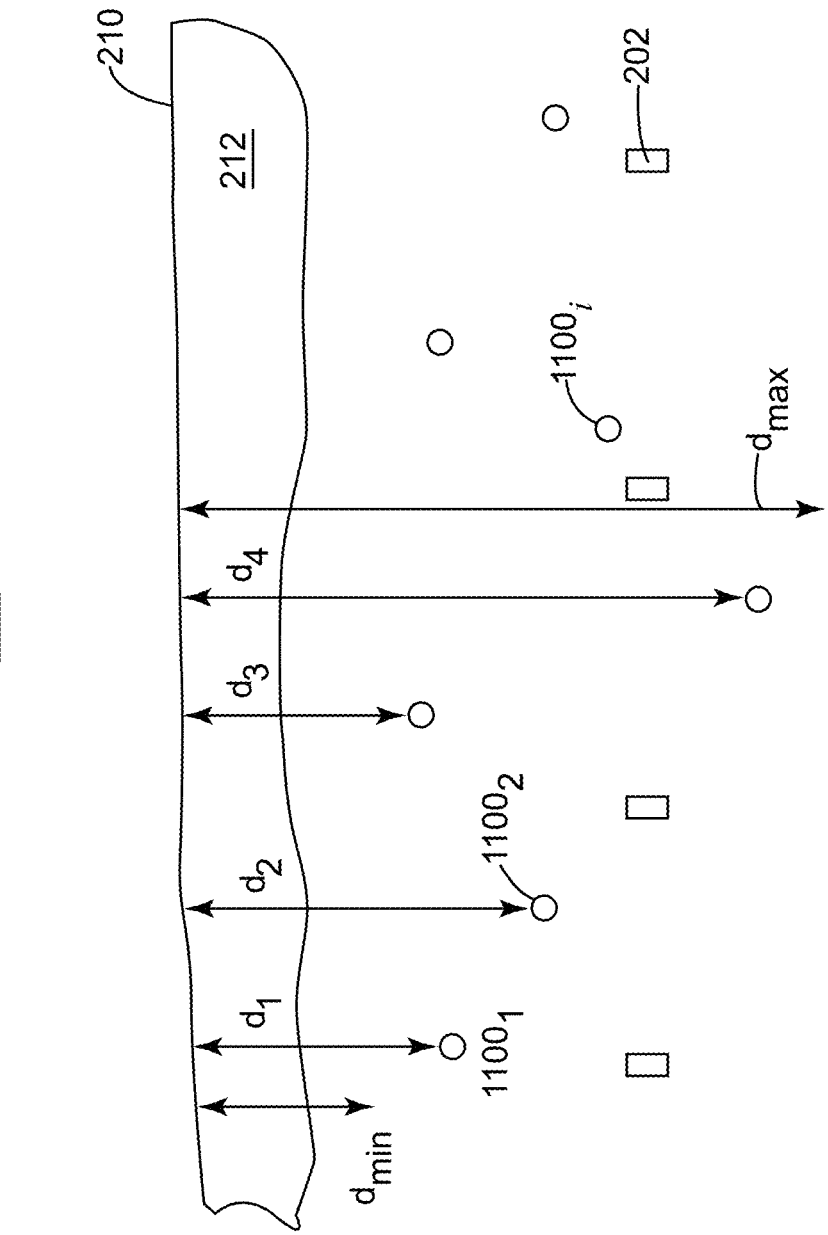
FIG. 11 is a side view of a random depth sensor system according to an exemplary embodiment.

According to another exemplary embodiment illustrated in FIG. 11, a system 1100 has the seismic sensors 1100i randomly distributed in terms of their depth. FIG. 11 shows only a line of sensors randomly distributed in depth, i.e., a depth of any sensor is randomly distributed between a minimum depth $d_{min}$ and a maximum depth $d_{max}$. The values of $d_{min}$ and $d_{max}$ may vary from survey to survey. In one application, the value $d_{max}$ is smaller than a depth of the seismic sources 202. The system 1100 may include more than a line of such sensors. In one application, each line is different from another line of the system.

FIGS. 12A to 14E illustrate a comparison between the traditional single depth sensor system having seismic sensors distributed at a same depth (FIG. 12A), the novel system having alternating dual-depth sensors (FIG. 13A) and the random-depth sensor system (FIG. 14A). FIGS. 12B, 13B and 14B show the individual traces in the common middle point gather, FIGS. 12C, 13C and 14C show the phases of the up-going waves, FIGS. 12D, 13D, and 14D show the CMP trace, and FIGS. 12E, 13E, and 14E illustrate the amplitude spectra of the CMP. It is noted how strong the notches 1200 and 1202 (FIG. 12E) are for the conventional system and how reduced they are in FIGS. 13E and 14E for the novel systems.

Other advantages of the novel systems are illustrated in FIGS. 15 and 16. FIG. 15 plots the travel-time variations (in ms) versus time for a dual hydrophone (DH) system, an alternating hydrophone system (AH) and a traditional single hydrophone (SH) system. FIG. 16 plots the same but for another observation well. Both figures indicate that the novel systems detect not only very small time shifts but also the small amplitude variations due to steam injection in the reservoir. Further, it is noted that the novel embodiments of alternating sensors and the randomly distributed sensors use less sensors than a dual-depth sensor system.

A couple of considerations regarding data processing are now discussed. These considerations are discussed with regard to the dual-depth seismic system illustrated in FIG. 2. However, these considerations are equally applicable to the other systems illustrated in FIGS. 9 and 11.

It is desired that the data processing preserves the amplitudes of the waves. Position errors associated with the location of the sensors for 4D seismic acquisitions is minimized because the sensors and sources are buried. Further, a good coupling between the earth and the sensors and/or sources is achieved by burring the sensors. Furthermore, near surface effects are attenuated in processing. However, source and sensor ghosts are transmitted through the weathering layer and may affect the repeatability of the signal. S-P wave interference needs to be considered.

Figure 17:
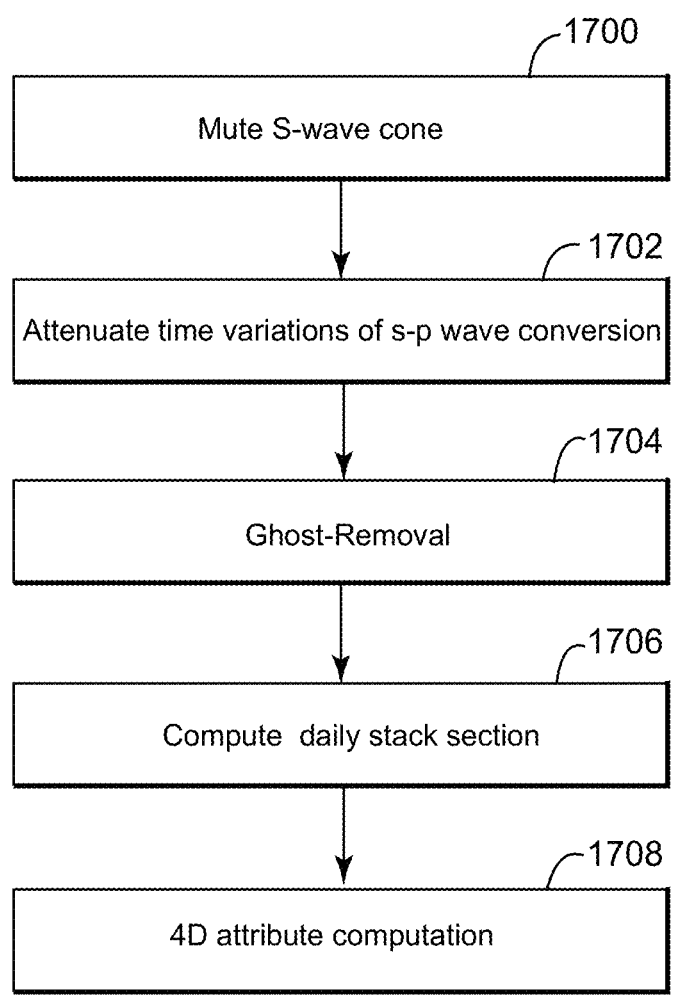
FIG. 17 is a flowchart of a method for processing data acquired with plural-depth sensor systems according to an exemplary embodiment.

The data processing flow, illustrated in FIG. 17, includes a step 1700 of muting the S-wave cone (i.e., removing the cone shown in FIGS. 3A and 3B), a step 1702 of attenuation of calendar variations of near surface S-P wave conversion, and a step 1704 of ghost-removal using, for example, dual-depth hydrophone summation at 6 and 9 m (depending on the type of survey). Further, in step 1706, the daily stack section is computed with the same velocity model, and in step 1708 the 4D attribute computation is performed by cross-correlation with a reference.

Figure 18:
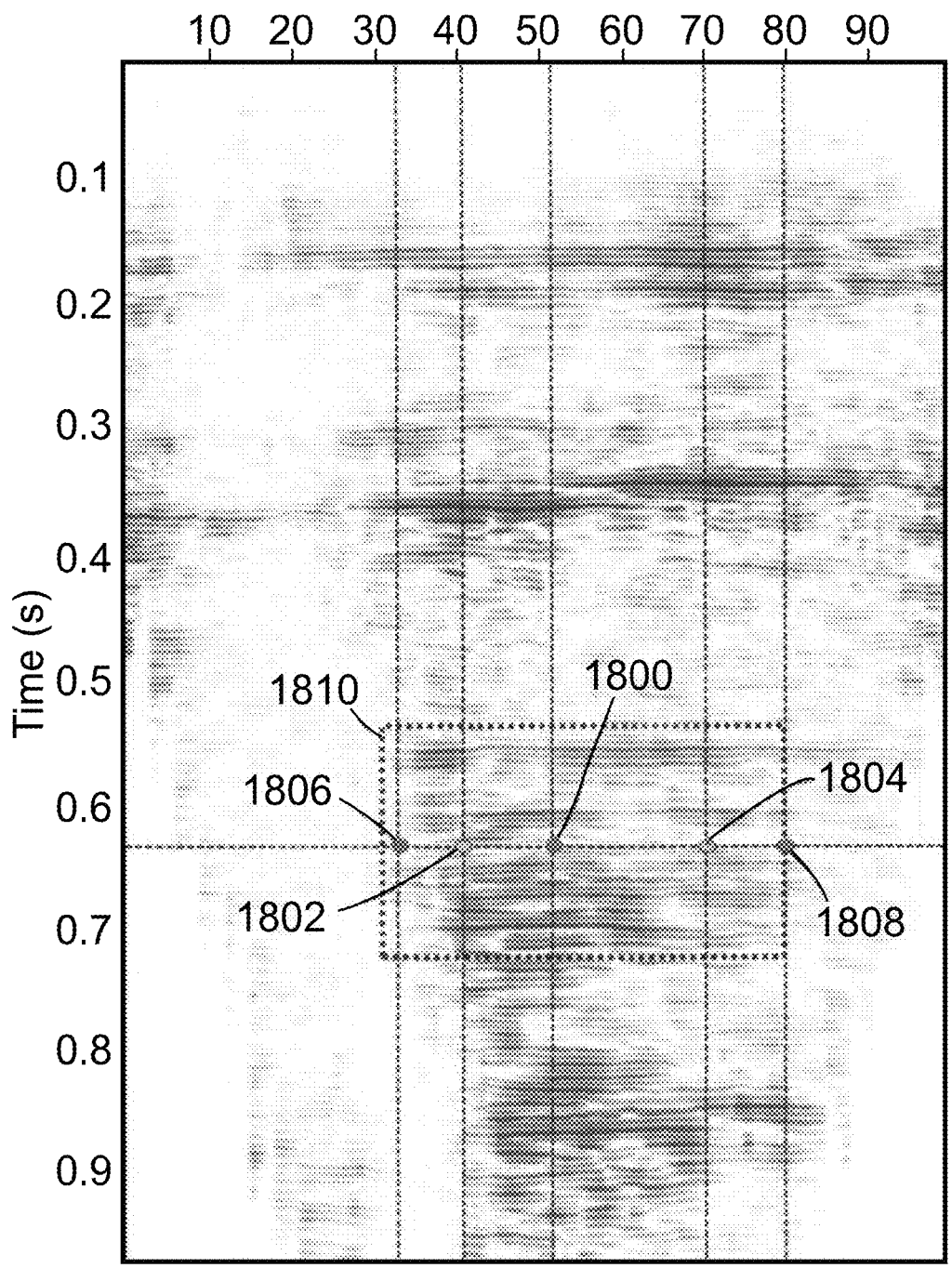
FIG. 18 is a 2D stack section according to an exemplary embodiment.

FIG. 18 shows the low-fold (<12), stack section. Element 1800 represents the horizontal injector wells, elements 1802 and 1804 represent observation wells, and elements 1806 and 1808 represent producing wells. Area 1810 is further enlarged in the following figures. Although the seismic response is rather poor on the left side of the profile, strong reflectors around the reservoir can be mapped. From one day to the next, it is virtually impossible to see changes in the stack section while 4D reservoir variations can be measured. The current daily stack section is cross-correlated on a trace by trace basis with a reference stack obtained before injection. Time shifts and amplitude variations are then picked on these cross-correlations to obtain 4D attributes. The lengths of the correlation windows may be 100 and 20 ms for the travel-time and amplitude, respectively.

Figure 19:
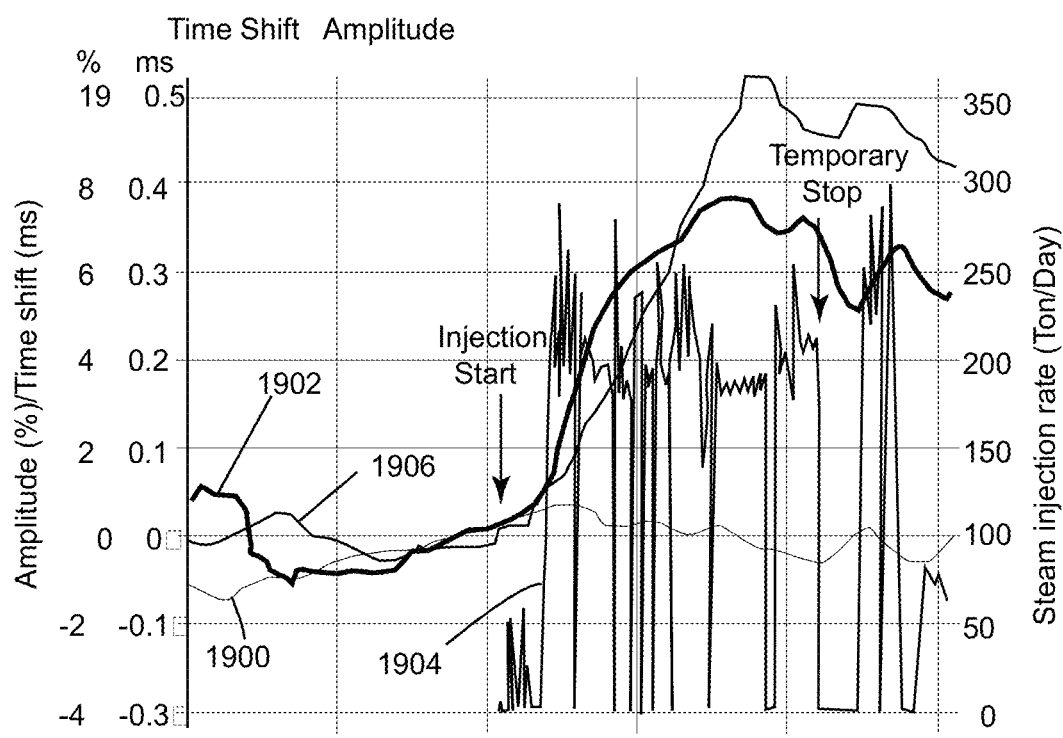
FIG. 19 illustrates a steam injection rate, seismic travel time shifts and amplitudes according to exemplary embodiments.

FIG. 19 shows both the seismic time shifts 1900 measured above and below the reservoir, the amplitude 1902, and the steam injection rate 1904 at the injector location. The steam injection started on May 9 and the full injection rate was reached around May 24. Also some temporary break down in the injection occurred due to maintenance on pumps. Curve 1906 represents the steam injection rate 1904 correlated with the seismic travel time shift 1900.

While there is virtually no change above the reservoir on the seismic reflection times, starts and stops of the injection are detected almost instantaneously on the time shift curves and with some delay on the amplitude curves. This increase in time shift (actually corresponding to a slowdown) can be interpreted as a pressure effect as it occurs rapidly over a large area.

The maximum observed cumulative variation of amplitude and time shift is 10% and 0.4 ms, respectively, after three months of steam injection nearby the injector. During the same period, the daily time shift is about 6 μs and daily amplitude variation is about 0.1%.

Figure 20A:
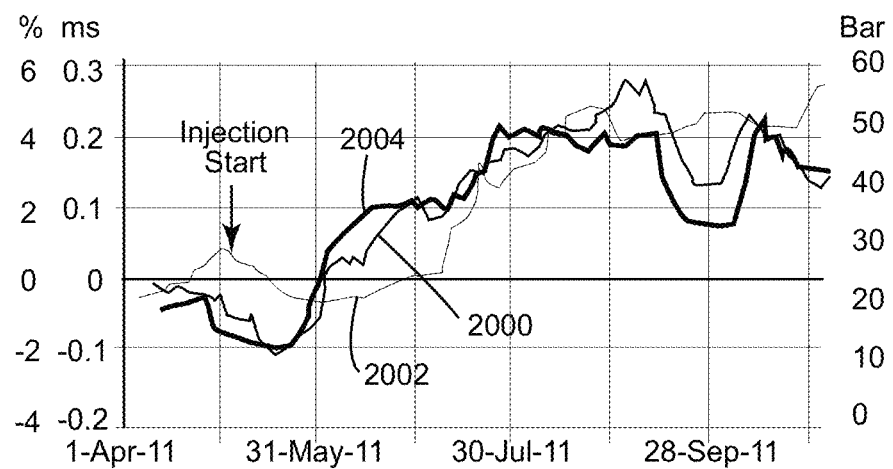
FIGS. 20A and 20B illustrate pressure, time shift and amplitude computed on the stack section according to exemplary embodiments.
Figure 20B:
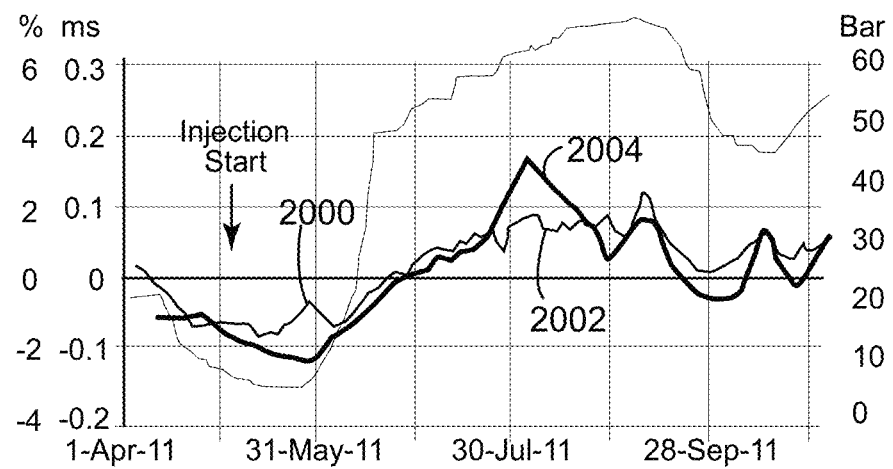

FIGS. 20A and 20B compare time shift 2000 and amplitude 2002 curves with the reservoir pressure curve 2004 measured at the two observation wells 1802 and 1804. The measured time shift encompasses a combined effect of pressure, temperature, gas saturation and steam. Ideally, these contributions can be discriminated using amplitude variations.

The swift spatial extension time shift values over a large area are due to pressure changes. Pressure variations with variable amplitude are observed suggesting that some areas are less connected to the injector than other areas. It is noted that these variations do not reach the production wells after almost 3 months after the injection. This corroborates with the well gauges measurements showing that the temperature at two production wells is still low. No temperature change is measured at the observation wells indicating that the changes are pressure-induced only, which is consistent with the high correlation between time-shifts and pressure with about 8 μs per bar in FIGS. 20A and 20B.

Regarding the amplitudes, it is observed a drastic change one month after the injection start up at the observation well 1802 located at a distance of 160 m from the injection point. The same one-month delayed response is observed after a temporary stop of the injection. It is expected a theoretical propagation of 5 m a day if it was to be explained by a physical phenomenon. Yet, there is almost no observed variation at the western observation well 1804, which is only 80 m away. It is suspected an unknown cause that prevents the propagation of the observed values. This should be calibrated by a reservoir model to confirm that the observed behavior is induced by both the steam and the presence of faults.

The precision and stability of the measurements allowed detection not only of a small time shift but also of a small variation in amplitude. The measurements complement those made in observations wells and should enable the reservoir engineers to construct more accurate dynamic models for better reservoir management decisions. As measured on observation and production wells, the steam field did not follow the expected path as described by modeling but seems to be either stopped by a fault or to follow yet another, more complex path that would be detected by a 3D acquisition design.

Figure 21:
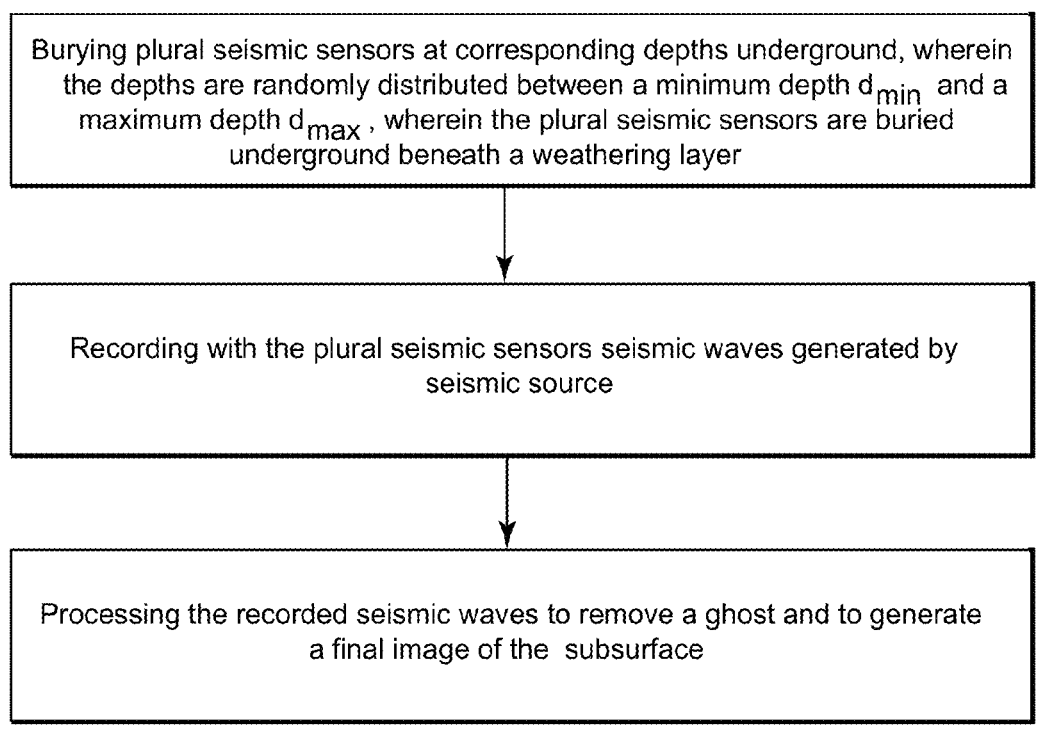
FIG. 21 is a flow chart of a method for recording seismic data with a multi-depth sensor system according to an exemplary embodiment.

The above-described systems may be used in the field to monitor a reservoir. Thus, a method for monitoring a reservoir is now discussed with regard to FIG. 21. The method includes a step 2100 of burying plural seismic sensors ($1100_i$) at corresponding depths underground, wherein the depths are randomly distributed between a minimum depth $d_{min}$ and a maximum depth $d_{max}$, wherein the plural seismic sensors ($1100_i$) are buried underground beneath a weathering layer (212); a step 2102 of recording with the plural seismic sensors ($1100_i$) seismic waves generated by seismic sources; and a step 2104 of processing the recorded seismic waves to remove a ghost and to generate a final image of the subsurface.

Figure 22:
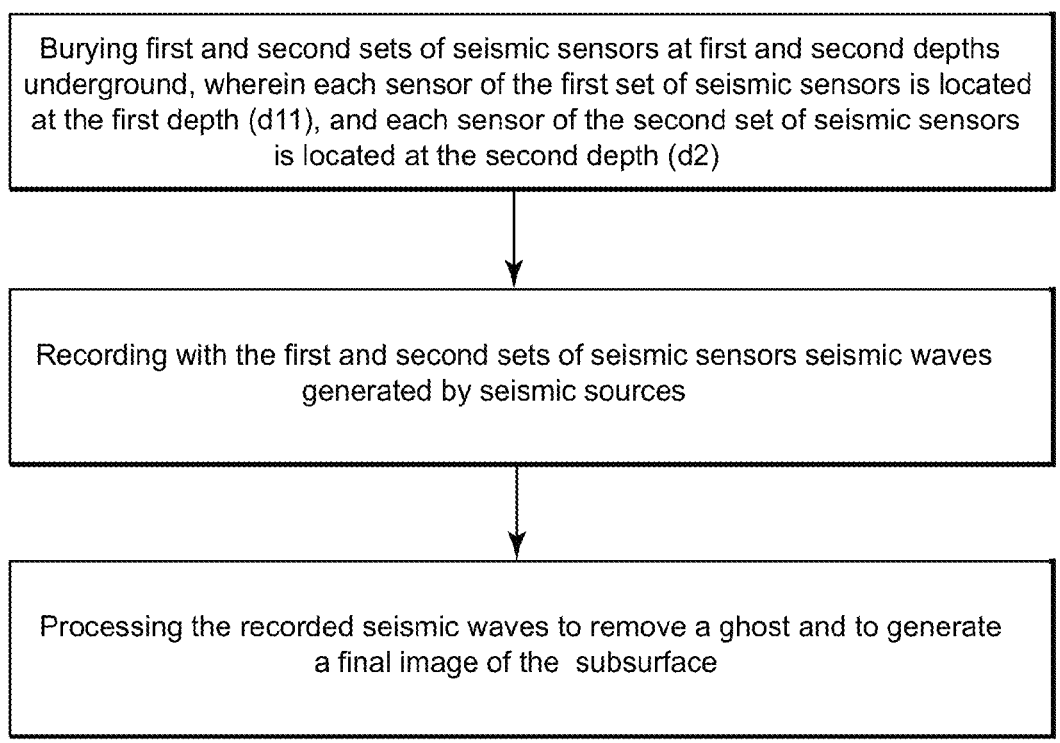
FIG. 22 is a flow chart of a method for recording seismic data with a random-depth sensor system according to an exemplary embodiment.
Figure 23:
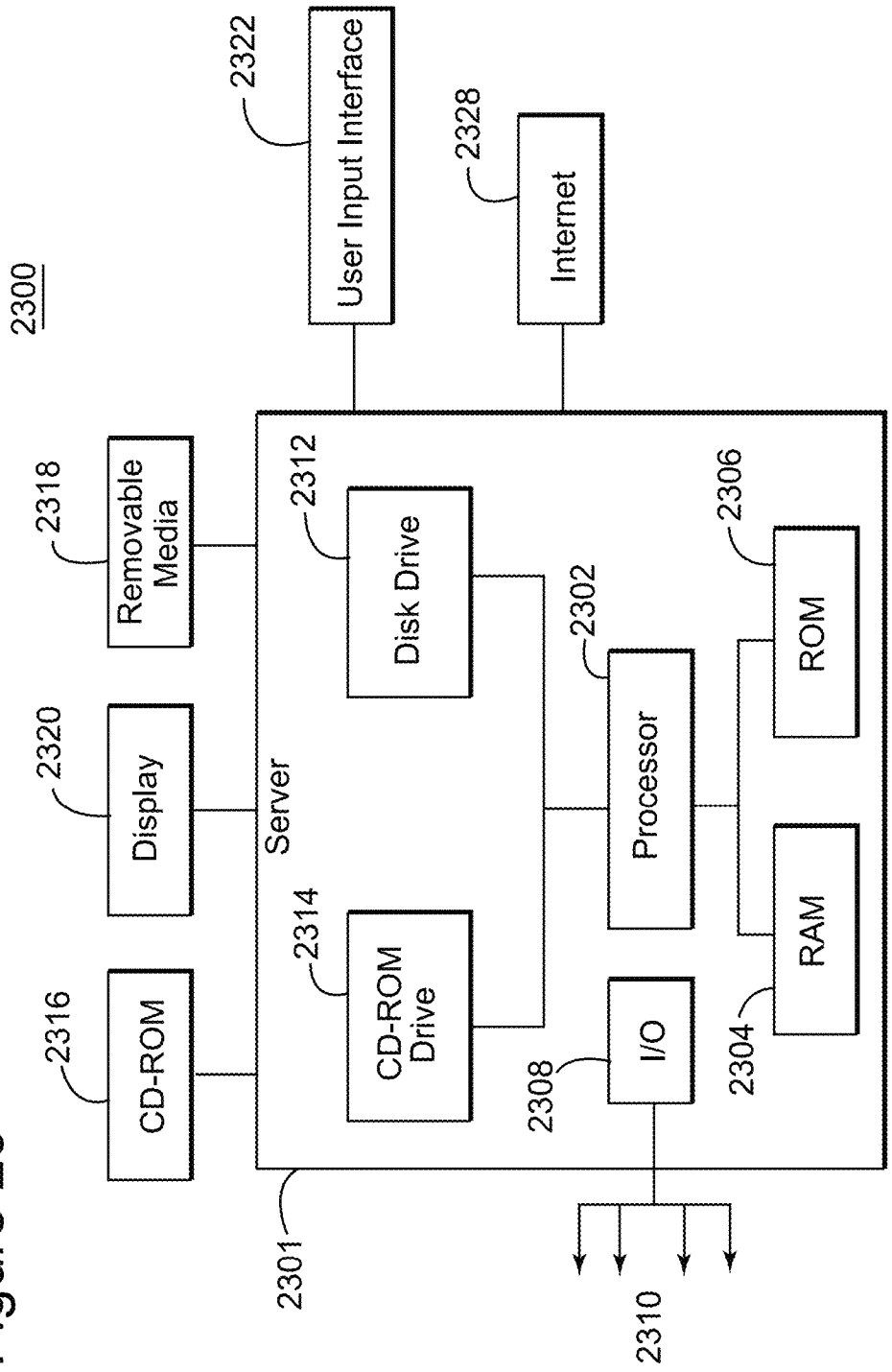
FIG. 23 is a schematic diagram of a computing device capable of implementing one or more of the methods discussed in the exemplary embodiments.

Another method for monitoring a reservoir is discussed with regard to FIG. 22. The method includes a step 2200 of burying first and second sets of seismic sensors ($204_i$, $206_i$) at first and second depths underground, wherein each sensor of the first set of seismic sensors ($204_i$) is located at the first depth (d1), and each sensor of the second set of seismic sensors ($206_i$) is located at the second depth (d2), a step 2202 of recording with the first and second sets of seismic sensors ($204_i$, $206_i$) seismic waves generated by seismic sources; and a step 2204 of processing the recorded seismic waves to remove a ghost and to generate a final image of the subsurface.

The above methods and others may be implemented in a computing system specifically configured to drive the seismic sources and to receive the seismic data recorded by the seismic sensors. An example of a representative computing system capable of carrying out operations in accordance with the exemplary embodiments is illustrated in FIG. 22. Hardware, firmware, software or a combination thereof may be used to perform the various steps and operations described herein.

The exemplary computing system 2300 suitable for performing the activities described in the exemplary embodiments may include server 2301. Such a server 2301 may include a central processor (CPU) 2302 coupled to a random access memory (RAM) 2304 and to a read-only memory (ROM) 2306. The ROM 2306 may also be other types of storage media to store programs, such as programmable ROM (PROM), erasable PROM (EPROM), etc. The processor 2302 may communicate with other internal and external components through input/output (I/O) circuitry 2308 and bussing 2310, to provide control signals and the like. The processor 2302 carries out a variety of functions as are known in the art, as dictated by software and/or firmware instructions.

The server 2301 may also include one or more data storage devices, including a hard drive 2312, CD-ROM drives 2314, and other hardware capable of reading and/or storing information such as DVD, etc. In one embodiment, software for carrying out the above-discussed steps may be stored and distributed on a CD-ROM 2316, removable memory device 2318 or other form of media capable of portably storing information. These storage media may be inserted into, and read by, devices such as the CD-ROM drive 2314, the disk drive 2312, etc. The server 2301 may be coupled to a display 2320, which may be any type of known display or presentation screen, such as LCD, LED displays, plasma display, cathode ray tubes (CRT), etc. A user input interface 2322 is provided, including one or more user interface mechanisms such as a mouse, keyboard, microphone, touch pad, touch screen, voice-recognition system, etc.

The server 2301 may be coupled to other computing devices, such as the landline and/or wireless terminals via a network. The server may be part of a larger network configuration as in a global area network (GAN) such as the Internet 2328, which allows ultimate connection to the various landline and/or mobile client devices. The computing device may be implemented on a vehicle that performs a land seismic survey.

The disclosed exemplary embodiments provide a system and a method for mechanically deploying geophones. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic data acquisition system for recording seismic waves related to a subsurface to be surveyed, the system comprising:
    plural seismic sensors forming plural lines of sensors when viewed from above ground, the plural seismic sensors located at corresponding depths underground, wherein the depths of individual seismic sensors within each one of the plural lines of sensors are randomly distributed between a minimum depth $d_{min}$ and a maximum depth $d_{max}$,
    wherein the plural seismic sensors are buried underground beneath a weathering layer, and
    the plural seismic sensors are monitoring the subsurface for determining changes in the subsurface.

2. The system of claim 1, wherein the plural seismic sensors form two lines of sensors when viewed from above ground.

3. The system of claim 2, wherein each line comprises a first set of seismic sensors and a second set of seismic sensors, the seismic sensors from the first and second sets of seismic sensors alternating along the line.

4. The system of claim 1, wherein the plural seismic sensors include at least one of a hydrophone, geophone, accelerometer or a combination thereof.

5. The system of claim 1, wherein the subsurface is below the ocean bottom.

6. The system of claim 1, further comprising:
    plural seismic sources buried underground,
    wherein the plural seismic sources are located at a same depth.

7. The system of claim 6, wherein the depth of the plural seismic sources is deeper than the depths of the plural seismic sensors.

8. A method for recording seismic waves related to a subsurface to be surveyed, the method comprising:
    burying plural seismic sensors in a plural lines of sensors when viewed from above ground, the plural seismic sensors located at corresponding depths underground, wherein the depths of individual seismic sensors within each one of the plural lines of sensors are randomly distributed between a minimum depth $d_{min}$ and a maximum depth $d_{max}$, wherein the plural seismic sensors are buried underground beneath a weathering layer;
    recording with the plural seismic sensors seismic waves generated by seismic sources; and
    processing the recorded seismic waves to remove a ghost and to generate a final image of the subsurface.

* * * * *